US011467400B2

(12) United States Patent
Chang et al.

(10) Patent No.: US 11,467,400 B2
(45) Date of Patent: Oct. 11, 2022

(54) INFORMATION DISPLAY METHOD AND INFORMATION DISPLAY SYSTEM

(71) Applicant: Industrial Technology Research Institute, Hsinchu (TW)

(72) Inventors: Ruo-Lan Chang, New Taipei (TW); Pi-Hsien Wang, Hsinchu (TW); Chih-Chia Chang, Hsinchu County (TW); Yu-Hsin Lin, Miaoli County (TW)

(73) Assignee: Industrial Technology Research Institute, Hsinchu (TW)

( * ) Notice: Subject to any disclaimer, the term of this patent is extended or adjusted under 35 U.S.C. 154(b) by 331 days.

(21) Appl. No.: 16/737,902

(22) Filed: Jan. 9, 2020

(65) Prior Publication Data

US 2021/0103143 A1   Apr. 8, 2021

(30) Foreign Application Priority Data

Oct. 4, 2019  (TW) ................. 108136025

(51) Int. Cl.
*G06T 3/60*  (2006.01)
*G06F 3/033*  (2013.01)
(Continued)

(52) U.S. Cl.
CPC ........ *G02B 27/0101* (2013.01); *G01B 11/002* (2013.01); *G01B 11/22* (2013.01); (Continued)

(58) Field of Classification Search
CPC .................................................... G06F 3/011
See application file for complete search history.

(56) References Cited

U.S. PATENT DOCUMENTS 8,157,651 B2   4/2012  Ohta et al.
8,708,822 B2   4/2014  Akasaka et al.
(Continued)

FOREIGN PATENT DOCUMENTS

CN   106725571   5/2017
CN   108008817   5/2018
(Continued)

OTHER PUBLICATIONS

"Office Action of Taiwan Counterpart Application", dated Sep. 4, 2020, p. 1-p. 7.

*Primary Examiner* — Nan-Ying Yang
(74) *Attorney, Agent, or Firm* — JCIPRNET

(57) ABSTRACT

An information display method and an information display system are provided. The method is adapted to the information display system including a first image capturing device and a transparent display, and the method includes the following steps. A pattern image is obtained by shooting a pattern placed on a real object through the first image capturing device, wherein the real object is located on one side of the transparent display. Relative position information between the transparent display and the pattern is obtained according to the pattern image. Augmented image data is obtained according to the relative position information. The augmented image data is displayed through the transparent display, wherein the augmented image data include a virtual object augmented based on the real object.

16 Claims, 12 Drawing Sheets

(51) Int. Cl.
  *G09G 5/00* (2006.01)
  *G02B 27/01* (2006.01)
  *G01B 11/00* (2006.01)
  *G01B 11/22* (2006.01)
  *G06T 7/80* (2017.01)
  *G01B 11/26* (2006.01)

(52) U.S. Cl.
  CPC ............... *G01B 11/26* (2013.01); *G06T 7/80* (2017.01); *G02B 2027/014* (2013.01); *G02B 2027/0138* (2013.01)

(56) References Cited

U.S. PATENT DOCUMENTS

| | | | |
|---|---|---|---|
| 8,708,824 B2 | 4/2014 | Ohta et al. | |
| 9,814,426 B2 | 11/2017 | Connor | |
| 9,830,444 B2 | 11/2017 | Kim et al. | |
| 9,892,489 B1* | 2/2018 | Roggendorf | G06T 19/00 |
| 2005/0206583 A1 | 9/2005 | Lemelson et al. | |
| 2011/0140994 A1* | 6/2011 | Noma | G02B 27/017 |
| | | | 345/8 |
| 2013/0222381 A1* | 8/2013 | Di Censo | G06F 3/0304 |
| | | | 345/424 |
| 2017/0323374 A1 | 11/2017 | Park | |
| 2019/0056693 A1 | 2/2019 | Gelman et al. | |

FOREIGN PATENT DOCUMENTS

| | | |
|---|---|---|
| CN | 208585173 | 3/2019 |
| TW | M490880 | 12/2014 |
| TW | 201525934 | 7/2015 |
| TW | 201633256 | 9/2016 |
| TW | 201724031 | 7/2017 |

\* cited by examiner

INFORMATION DISPLAY METHOD AND INFORMATION DISPLAY SYSTEM

CROSS-REFERENCE TO RELATED APPLICATION

This application claims the priority benefit of Taiwan application no. 108136025, filed on Oct. 4, 2019. The entirety of the above-mentioned patent application is hereby incorporated by reference herein.

TECHNICAL FIELD

The disclosure relates to an information display method and an information display system.

BACKGROUND

Transparent displays may be divided into transmissive transparent displays and projection transparent displays according to their technical principles. The transparent display is transparent, thin and light, and may combine a virtual image displayed on a display with the real-world scene to provide the user a direct and intuitive visual experience. The transparent display may be introduced in various applications, including car head-up displays, vending machines, merchandise windows, museum exhibits, sightseeing vehicle tours, and medical industries. Viewers may view not only a real object through the transparent display, but also virtual information superposed on or displayed around the real object through the transparent display. By projecting the virtual information into the real world through the transparent display, users may have better perception and understanding of the surrounding environment.

Since the virtual information displayed through the transparent display is augmented based on the real object, the degree of superposition of the virtual information and the real object will directly affect a viewing experience of the viewer. For instance, if the transparent display superposes and displays the virtual information including the related information of a first real object around or above a second real object, the viewer may be have trouble understanding the information. Especially, in the case where the transparent display may be dynamically moved, a geometric positional relationship between the transparent display and the real object including a relative position, a rotation range, a tilt angle and the like may not be accurately confirmed, and thus the virtual information may not be accurately displayed at the appropriate position. Consequently, the virtual information presented on the transparent display is difficult to accurately superpose with the real object.

SUMMARY

An embodiment of the disclosure provides an information display method, which is adapted to the information display system including a first image capturing device and a transparent display, and the method includes the following steps. A pattern image is obtained by shooting a pattern placed on a real object through the first image capturing device, wherein the real object is located on one side of the transparent display. Relative position information between the transparent display and the pattern is obtained according to the pattern image. Augmented image data is obtained according to the relative position information. The augmented image data is displayed through the transparent display, wherein the augmented image data include a virtual object augmented based on the real object.

An embodiment of the disclosure provides an information display system, which includes at least one pattern, a transparent display, a first image capturing device and a processing device. The first image capturing device obtains a pattern image by shooting a pattern placed on a real object, wherein the real object is located on one side of the transparent display. The processing device is coupled to the transparent display and the first image capturing device, and the processing device is configured to perform following steps of: obtaining relative position information between the transparent display and the pattern according to the pattern image; obtaining augmented image data according to the relative position information; and displaying the augmented image data through the transparent display, wherein the augmented image data include a virtual object augmented based on the real object.

To make the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

Figure 1:
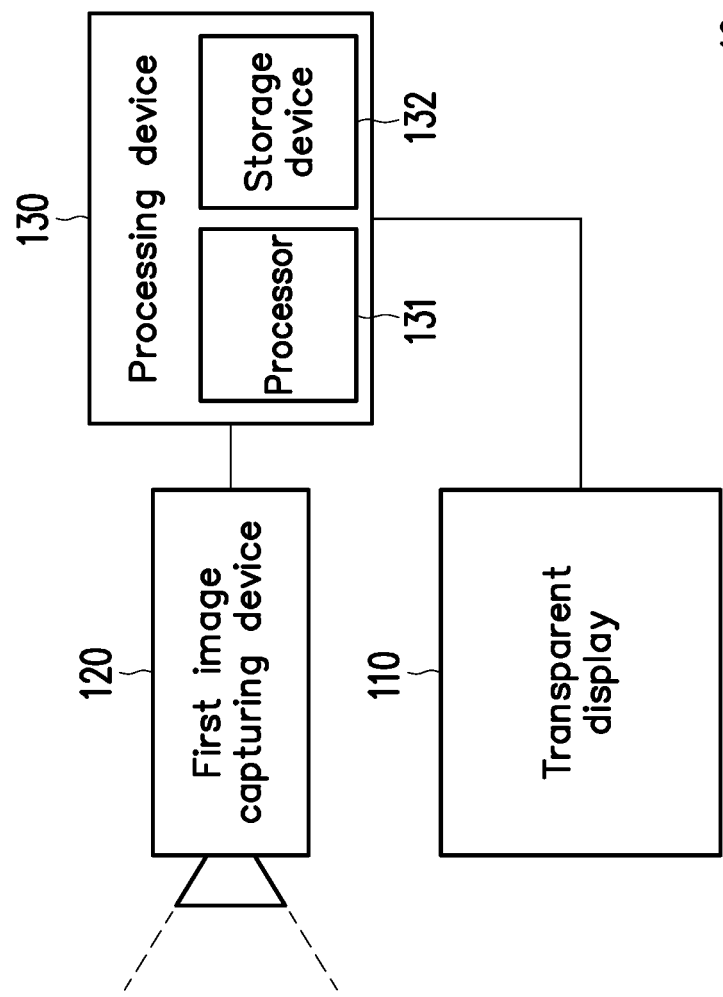
FIG. 1 is a schematic diagram of the information display system according to an embodiment of the disclosure.
Figure 1:
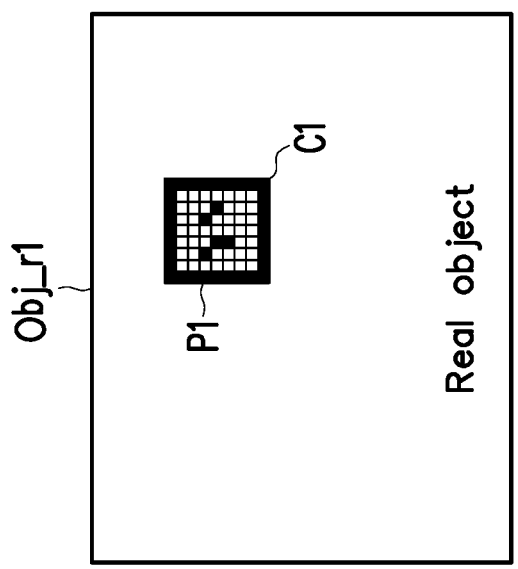

In the following detailed description, for purposes of explanation, numerous details are set forth in order to provide a thorough understanding of the disclosed embodiments. It will be apparent, however, that one or more embodiments may be practiced without these details. In other instances, well-known structures and devices are schematically shown in order to simplify the drawing.

Some embodiments of the disclosure are described in details below by reference with the accompanying drawings, and as for reference numbers cited in the following description, the same reference numbers in difference drawings are referring to the same or like parts. The embodiments are merely a part of the disclosure rather than disclosing all possible embodiments of the disclosure. More specifically, these embodiments are simply examples of the information display method and the information display system in the disclosure.

FIG. 1 is a schematic diagram of the information display system according to an embodiment of the disclosure. Referring to FIG. 1, an information display system 10 includes at least one pattern P1, a transparent display 110, a first image capturing device 120 and a processing device 130. The processing device 130 is coupled to the transparent display 110 and the first image capturing device 120.

The pattern P1 may be printed on an adhesive carrier or displayed on an electronic paper, and the adhesive carrier or the electronic paper on which the pattern P1 is placed may be located on a preset position of areal object Obj_r1. The pattern P1 has a plurality of feature points (e.g., a corner point C1), which may be used in a subsequent process for recognizing relative position information between the pattern P1 and the transparent display 110. In an embodiment of the disclosure, the pattern P1 may include more than one one-dimensional barcode, two-dimensional barcode or other recognizable pattern, but the disclosure is not limited thereto.

The transparent display 110 is a display with a certain degree of transparency that allows a human user to view a scene on the other side the display relative to the viewer, such as the transmissive transparent displays including a thin film transistor liquid crystal display (TFT-LCD), a field sequential color display, an active matrix organic light emitting display (AMOLED), an electro-wetting display, or the projection transparent displays.

The first image capturing device 120 is adapted to perform an image sensing function. In an embodiment of the disclosure, the first image capturing device 120 may include a lens and a photosensitive element for obtaining a pattern image by shooting the pattern P1 placed on the real object Obj_r1. The photosensitive element is configured to sense an intensity of light ray entering the lens in order to generate an image. The photosensitive element may be, for example, a charge coupled device (CCD), a complementary metal-oxide semiconductor (CMOS) element or other elements, which are not particularly limited by the disclosure. In an embodiment of the disclosure, because the first image capturing device 120 is disposed on the transparent display 110, a position and a shooting direction of the first image capturing device 120 will change if the transparent display 110 is moved.

The processing device 130 includes one or more processors (described below with a processor 131 as representative) and one or more storage devices (described below with a storage device 132 as representative). The processing device 130 may be implemented by using a computer host, a server or a computer device with data processing capability. In addition, the processing device 130 may be implemented by using one or more electronic devices, which are not particularly limited by the disclosure.

The processor 131 is, for example, a central processing unit (CPU) or other programmable devices for general purpose or special purpose such as a microprocessor and a digital signal processor (DSP), a programmable controller, an application specific integrated circuit (ASIC), a programmable logic device (PLD) or other similar devices or a combination of above-mentioned devices. The processor 131 is configured to execute commands or programs recorded by the storage device 132.

The storage device 132 may be a fixed or a movable device in any possible forms including a random access memory (RAM), a read-only memory (ROM), a flash memory or other similar elements, or a combination of the above-mentioned elements. The storage device 132 is configured to store image data and the programs or the commands that may be accessed and executed by the processor 131.

Implementation details of the information display method and the information display system will be described with reference to each element in the information display system 10 in the following embodiments.

Figure 2:
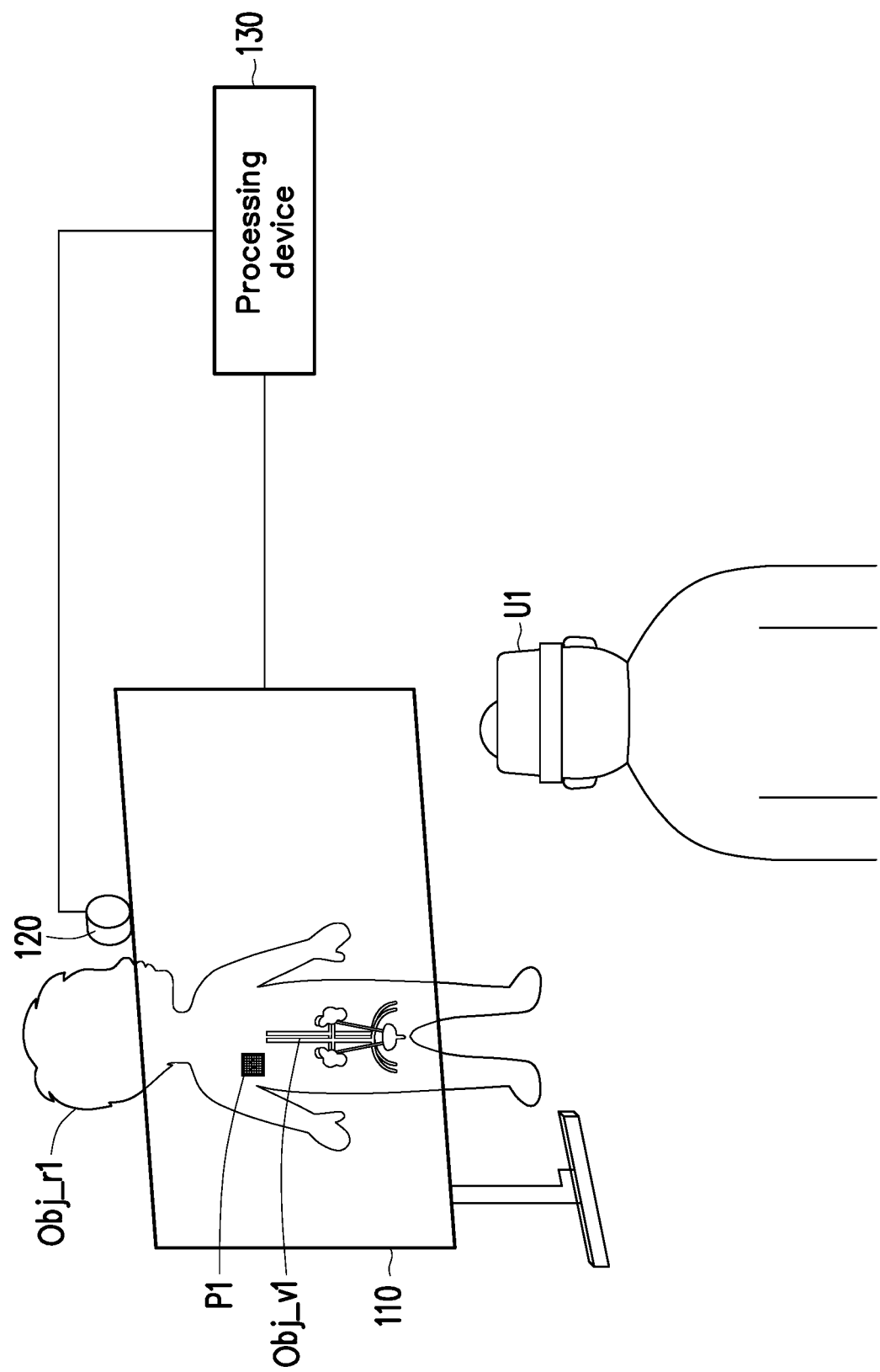
FIG. 2 is a schematic scenario diagram of the information display system according to an embodiment of the disclosure.

FIG. 2 is a schematic scenario diagram of the information display system according to an embodiment of the disclosure. Referring to FIG. 2, in an embodiment of the disclosure, the first image capturing device 120 may be fixedly disposed at, for example, the middle of an upper side of the transparent display 110 and configured to perform the image sensing function on the real object Obj_r1 behind the transparent display 110. However, the disclosure is not limited in this regard. In other embodiments, the first image capturing device 120 may be disposed on a left side, a right side or a lower side of the transparent display 110. In addition, the transparent display 110 is disposed between a viewer U1 and the real object Obj_r1. Accordingly, the viewer U1 may view the real object Obj_r1 through the transparent display 110, and may simultaneously view augmented image data including a virtual object Obj_v1 displayed by the transparent display 110.

As shown in FIG. 2, the at least one pattern P1 is placed on the real object Obj_r1, and the first image capturing device 120 obtains the pattern image by shooting the pattern P1. After the pattern image is captured by the first image capturing device 120, the processing device 130 may calculate the relative position information between the pattern P1 and the transparent display 110 by analyzing pattern information in the pattern image, and then obtain the corresponding augmented image data according to the relative position information.

As a position or a placing angle of the transparent display 110 changes, the relative position information between the pattern P1 and the transparent display 110 will also correspondingly change. Correspondingly, in response to the changes in the relative position information the pattern P1 and the transparent display 110, the transparent display 110 also adjusts a displaying position of the visual object Obj_v1 in the augmented image data. In other words, the displaying position of the virtual object Obj_v1 in a display screen of the transparent display 110 is determined according to the relative position information between the pattern P1 and the transparent display 110. In this way, when the viewer U1 is viewing the transparent display 110, the virtual object Obj_v1 displayed by the transparent display 110 may be superposed on the real object Obj_r1 to thereby improve the viewing experience of the viewer.

Figure 3:
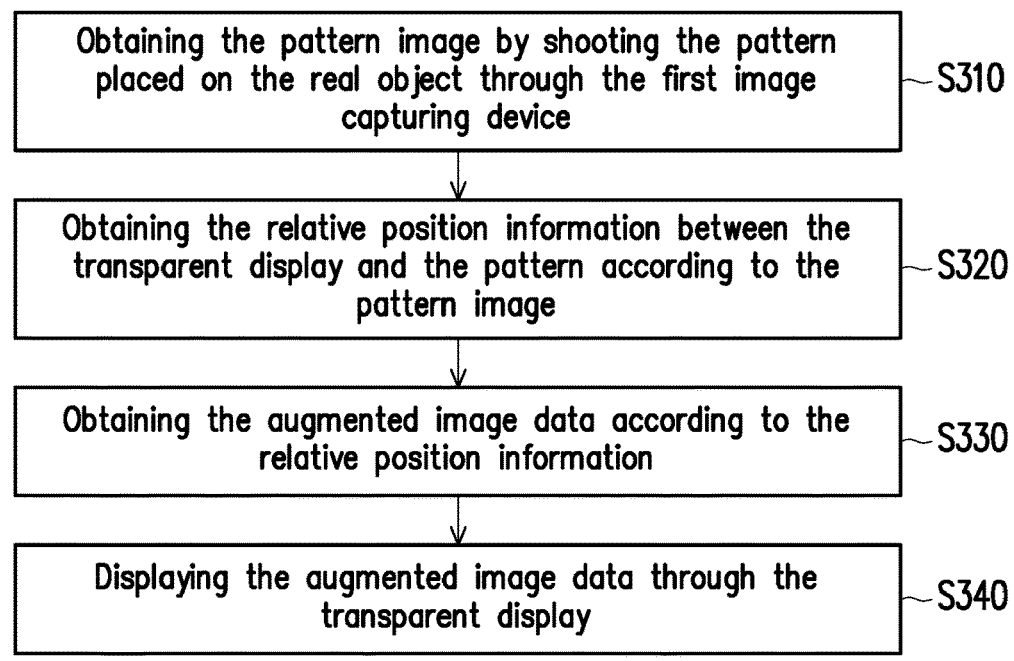
FIG. 3 is a flowchart of the information display method according to an embodiment of the disclosure.

FIG. 3 is a flowchart of the information display method according to an embodiment of the disclosure. The method described in FIG. 3 may be implemented in combination with the information display system 10 shown in FIG. 1. The following content refers to FIG. 1, FIG. 2 and FIG. 3 together.

In step S310, the pattern image is obtained by shooting the pattern P1 placed on the real object Obj_r1 through the first image capturing device 120. As shown in FIG. 2, the real object Obj_r1 is located at a rear side of the transparent display 110, and the viewer U1 is located at a front side of the transparent display 110. A capturing direction of the first image capturing device 120 faces the rear side of the transparent display 110. In step S320, the relative position information between the transparent display 110 and the pattern P1 is obtained according to the pattern image by the processing device 130. Here, the relative position information between the transparent display 110 and the pattern P1 may include distance information, angle information or coordinate information.

An actual size of the pattern P1 may be designed according to a resolution of the first image capturing device 120. The pattern P1 may be attached onto the real object Obj_r1, and a carrier surface of the pattern P1 may thus be uneven, resulting in the calculated relative position information with errors. If the actual size of the pattern P1 may be reduced, the degree of deformation on the carrier surface of the pattern P1 may be reduced to improve a calculation accuracy of the relative position information. Nonetheless, if the actual size of the pattern P1 is too small, pattern features in the pattern image may be insufficient to accurately calculate the relative position information. In an embodiment of the disclosure, the actual size of the pattern P1 may be designed according to the resolution of the first image capturing device 120, so as to effectively reduce the degree of deformation on the carrier surface of the pattern P1 and prevent the pattern features from being insufficient.

Next, in step S330, the augmented image data is obtained according to the relative position information by the processing device 130. Here, the processing device 130 may calculate the augmented image data according to the relative position information, or may retrieve the augmented image data previously created according to the relative position information from an image database. By performing a geometric transformation on a basic image according to the relative position information, the processing device 130 may obtain the augmented image data corresponding to different relative position information. The geometric transformation described above may include a scaling process, a rotation process, a translation process, an affine transformation or other geometric mapping conversions. In step S340, the augmented image data is displayed through the transparent display 110. The augmented image data include the virtual object Obj_v1 augmented based on the real object Obj_r1. Thus, the augmented image data displayed by the transparent display 110 is determined according to the relative position information between the transparent display 110 and the pattern P1.

In a medical application scenario, the real object Obj_r1 may be a human body, and the viewer U1 may be a medical personnel. The pattern P1 may be attached onto, for example, a preset portion of the human body. The transparent display 110 may display related medical information such as organ information or surgical information. When the transparent display 110 is required to provide the related medical information of the human body, the medical personnel may have the transparent display 110 arranged between herself/himself and the real object Obj_r1 in order to simultaneously view the human body and the virtual object Obj_v1 augmented based on the human body through the transparent display 110. When the transparent display 110 is not required to provide the related medical information of the human body, the medical personnel may have the transparent display 110 moved away. Accordingly, the medical personnel may move the transparent display 110 back and forth during a clinical teaching or a surgery process. In an embodiment of the disclosure, the processing device 130 may determine the augmented image data according to the relative position information between the transparent display 110 and the pattern P1. In this way, even though the transparent display 110 is dynamically moved, the virtual object Obj_v1 augmented based on the human body may still be superposed with the human body. For instance, assuming that the virtual object Obj_v1 is heart mapping information, even though the transparent display 110 is moved back and forth, the medical personnel may still see that the heart map displayed by the transparent display 110 is superposed on a part portion of the human body.

Figure 4:
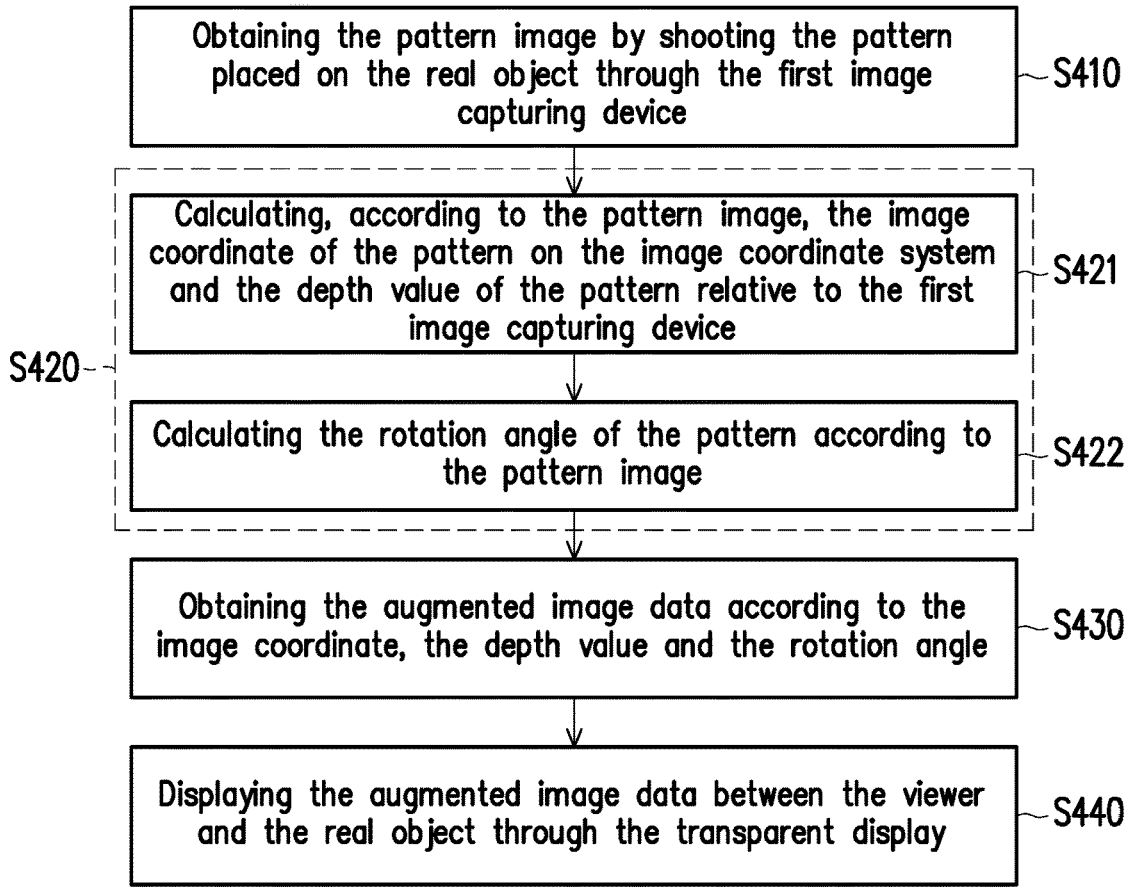
FIG. 4 is a flowchart of the information display method according to an embodiment of the disclosure.

FIG. 4 is a flowchart of the information display method according to an embodiment of the disclosure. The method described in FIG. 4 may be implemented in combination with the information display system 10 shown in FIG. 1. In the embodiment of FIG. 4, the relative position information may include an image coordinate of the pattern P1 on an image coordinate system, a depth value of the pattern P1 relative to the first image capturing device 120 and a rotation angle of the pattern P1.

Referring to FIG. 1 and FIG. 4 together, in step S410, the pattern image is obtained by shooting the pattern P1 placed on the real object Obj_r1 through the first image capturing device 120. In an embodiment of the disclosure, the processing device 130 may perform an image calibration on the pattern image to calibrate the pattern image with possible lens distortion so the processing device 130 may calculate the relative position information more accurately according to the calibrated pattern image. Here, step S420 for obtaining the relative position information may include steps S421 and S422. In step S421, according to the pattern image, the image coordinate of the pattern P1 on the image coordinate system and the depth value of the pattern P1 relative to the first image capturing device 120 are calculated by the processing device 130.

The actual size information of the pattern P1 is known, by comparing imaging size information of the pattern P1 on the pattern image with the actual size information of the pattern P1, the processing device 130 may estimate a distance between the pattern P1 and the first image capturing device (i.e., the depth value). The actual size information and the imaging size information of the pattern P1 may be length information between two image feature points of the pattern P1, but the disclosure is not limited thereto. In an embodiment of the disclosure, the processing device 130 may calculate the depth value according to an intrinsic parameter of the first image capturing device 120, the actual size information of the pattern P1 and the imaging size information of the pattern P1 on the pattern image. The intrinsic parameter of the first image capturing device 120 may include focal distance information of the first image capturing device 120, and the intrinsic parameter of the first image capturing device 120 may be obtained through a camera calibration procedure.

Figure 5:
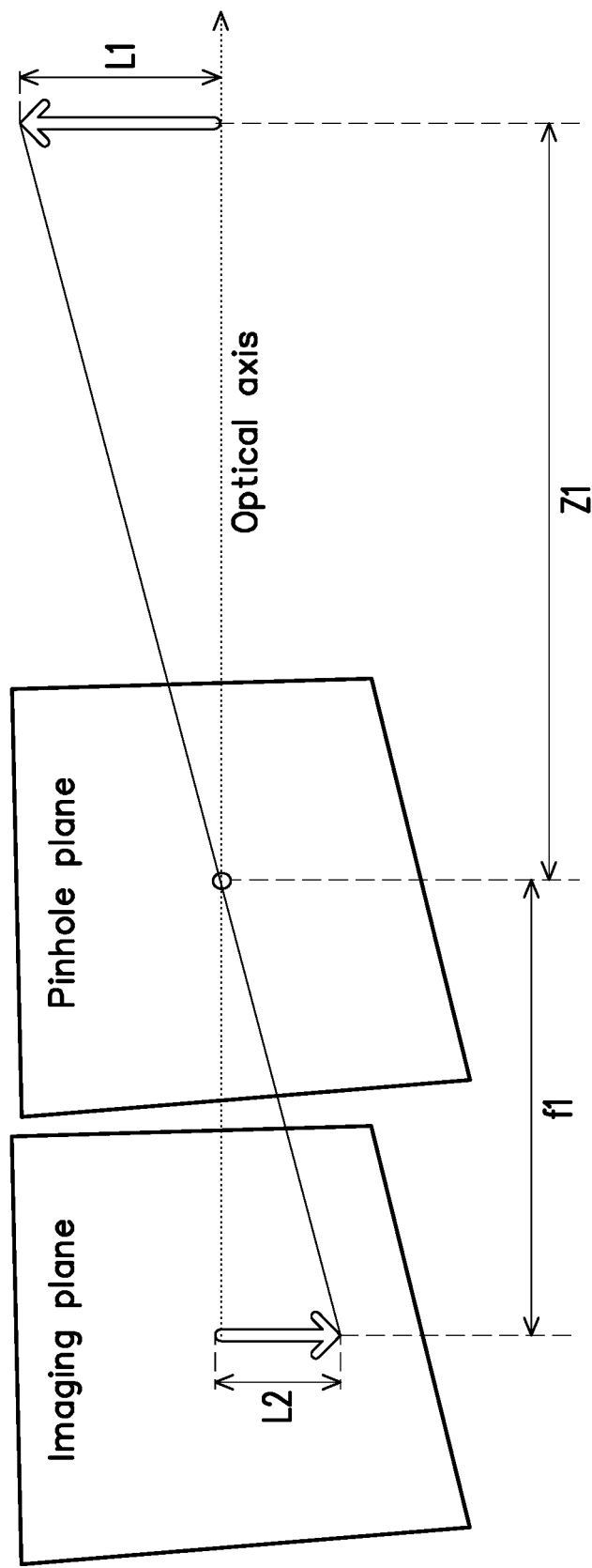
FIG. 5 is a schematic diagram for calculating a depth value according to an embodiment of the disclosure.

Referring FIG. 5, FIG. 5 is a schematic diagram for calculating a depth value according to an embodiment of the disclosure. Based on the principle of similar triangles, a ratio between actual size information L1 of the pattern P1 and a depth value Z1 is proportional to a ratio between imaging size information L2 of the pattern P1 and focal length information f1. Accordingly, in the case where the processing device 130 knows the actual size information L1 of the pattern P1, the focal distance information f1 and the imaging size information L2 of the pattern P1, the processing device 130 may obtain the depth value Z1 of the pattern P1 relative to the first image capturing device 120 according to Equation (1).

$$L2 = f1 * (L1/Z1) \quad \text{Equation (1)}$$

In an embodiment of the disclosure, according to an imaging position of the pattern P1 on the pattern image (e.g., pixel coordinates of specific pattern features), the processing device 130 may directly obtain the image coordinate of the pattern P1 on the imaging coordinate system, that is, a two-dimensional image coordinate on an imaging plane. Alternatively, in an embodiment of the disclosure, the processing device 130 may calculate the image coordinate of the pattern P1 on the image coordinate system according to a world coordinate of the pattern P1 and the intrinsic parameter of the first image capturing device 120. In the case where the world coordinate of the pattern P1 on a world coordinate system is already marked as $(X_w, Y_w, Z_w)$ through the camera calibration procedure, the processing device 130 may calculate the two-dimensional image coordinate of the pattern P1 projected on the imaging plane according to an intrinsic parameter matrix $$\begin{bmatrix} f_x & 0 & u_0 \\ 0 & f_y & v_0 \\ 0 & 0 & 1 \end{bmatrix}$$

of the first image capturing device 120. In an embodiment, the processing device 130 may obtain an image coordinate (x, y) of the pattern P1 projected on the imaging plane according to Equation (2) and Equation (3).

$$x = (f_x * X_w/Z_w) + u_0 \quad \text{Equation (2)}$$

$$y = (f_y * Y_w/Z_w) + v_0 \quad \text{Equation (3)}$$

Next, in step S422, the rotation angle of the pattern P1 is calculated according to the pattern image by the processing device 130. The rotation angle of the pattern P1 may be regarded as a normal direction of the carrier surface on which the pattern P1 is placed, and said normal direction may be defined by three-axis rotation angles. In an embodiment of the disclosure, the processing device 130 may calculate the rotation angle of the pattern P1 according to a geometric relationship between a plurality of image feature points of the pattern P1 placed on the pattern image. In an example wherein the pattern P1 is a rectangle, the processing device 130 may calculate the normal direction of the surface of the pattern P1 (i.e., the rotation angle of the pattern P1) according to two actual side lengths of the pattern P1 and the corresponding imaging side lengths.

In an embodiment of the disclosure, the processing device 130 may calculate the rotation angle of the pattern P1 according to a camera parameter of the first image capturing device 120. According to Equation (4), the processing device 130 may calculate an extrinsic parameter matrix of the first image capturing device 120 according to the world coordinate $(X_w, Y_w, Z_w)$ of the pattern P1, the image coordinate (x, y) of the pattern P1 and the intrinsic parameter of the first image capturing device 120. Here, the world coordinate $(X_w, Y_w, Z_w)$ of the pattern P1 and the intrinsic parameter of the first image capturing device 120 may be obtained from the previously performed camera calibration procedure. In the case where the world coordinate of the pattern P1 on the world coordinate system is positioned at $(X_w, Y_w, Z_w)$ through the camera calibration procedure, the processing device 130 may calculate the extrinsic parameter matrix of the first image capturing device 120 based on the intrinsic parameter matrix of the first image capturing device 120 and the image coordinate (x, y) of the pattern P1. Here, the intrinsic parameter matrix and the extrinsic parameter matrix are used to describe a conversion relationship between the image coordinate system and the world coordinate system.

$$\begin{bmatrix} x \\ y \\ 1 \end{bmatrix} = \begin{bmatrix} f_x & 0 & u_0 \\ 0 & f_y & v_0 \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} X_w \\ Y_w \\ Z_w \\ 1 \end{bmatrix} \quad \text{Equation (4)}$$

wherein $$\begin{bmatrix} f_x & 0 & u_0 \\ 0 & f_y & v_0 \\ 0 & 0 & 1 \end{bmatrix}$$

is the intrinsic parameter matrix of the first image capturing device 120, and $$\begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} = [R \mid t]$$

is the extrinsic parameter matrix of the first image capturing device 120. The extrinsic parameter matrix includes a rotation matrix R and a translation vector t. The extrinsic parameter matrix of the first image capturing device 120 may be used to represent the position and the shooting direction of the first image capturing device 120 in the world coordinate system.

Next, the processing device 130 may calculate the rotation angle according to the extrinsic parameter matrix of the first image capturing device 120. Based on Equation (5), the processing device 130 may calculate the three-axis rotation angles ($\phi$, $\theta$, $\psi$), i.e., the rotation angle of the pattern P1, according to the rotation matrix R in the extrinsic parameter matrix. Here, $\phi$ is a rotation angle corresponding to Z axis; $\theta$ is a rotation angle corresponding to Y axis; $\psi$ is a rotation angle corresponding X axis.

$$R = \begin{bmatrix} \cos\theta\cos\phi & \sin\psi\sin\theta\cos\phi - \cos\psi\sin\phi & \cos\psi\sin\theta\cos\phi + \sin\psi\sin\phi \\ \cos\theta\sin\phi & \sin\psi\sin\theta\sin\phi + \cos\psi\cos\phi & \cos\psi\sin\theta\sin\phi - \sin\psi\cos\phi \\ -\sin\theta & \sin\psi\cos\theta & \cos\psi\cos\theta \end{bmatrix} \quad \text{Equation (5)}$$

After the relative position information is obtained according to the pattern image, in step S430, the augmented image data is obtained according to the image coordinate, the depth value and the rotation angle by the processing device 130. Thus, the displayed augmented image data is generated by performing the geometric transformation on basic image data according to the image coordinate, the depth value and the rotation angle. Here, the basic image data corresponds to a reference image coordinate, a reference depth value and a reference rotation angle. The augmented image data is generated by performing the geometric transformation on the basic image data according to a coordinate difference between the reference image coordinate and the image coordinate, a depth difference between the reference depth value and the depth value and an angle difference between the reference rotation angle and the rotation angle. The processing device 130 may perform the translation process on the basic image data according to the coordinate difference; the processing device 130 may perform the scaling process on the basic image data according to the depth difference; the processing device 130 may perform the affine transformation on the basic image data according to the rotation angle difference. The augmented image data may be generated instantly by performing a real-time operation according to the geometric transformation described above. Alternatively, the augmented image data may be calculated in advance according to the geometric transformation described above and recorded in the image database. Accordingly, the processing device 130 may select the corresponding augmented image data from the image database according to the detected image coordinate, the depth value and the rotation angle. In step S440, the augmented image data is displayed between the viewer U1 and the real object Obj_r1 through the transparent display 110.

In an embodiment of the disclosure, the operation of performing the geometric transformation on the basic image data may be executed in advance to create an image database. In other words, the image database is stored with the augmented image data corresponding to different preset image coordinates, different preset depth values and different preset rotation angles. Accordingly, the processing device 130 may select the corresponding augmented image data by searching the image database according to the image coordinate, the depth value and the rotation angle generated based on the pattern image, so as to achieve an instant display effect. How the reference image coordinate, the reference depth value and the reference rotation angle corresponding to the basic image are defined and how the image database that allows the processing device 130 to instantly search is created will be described below with reference to various embodiments.

Figure 6:
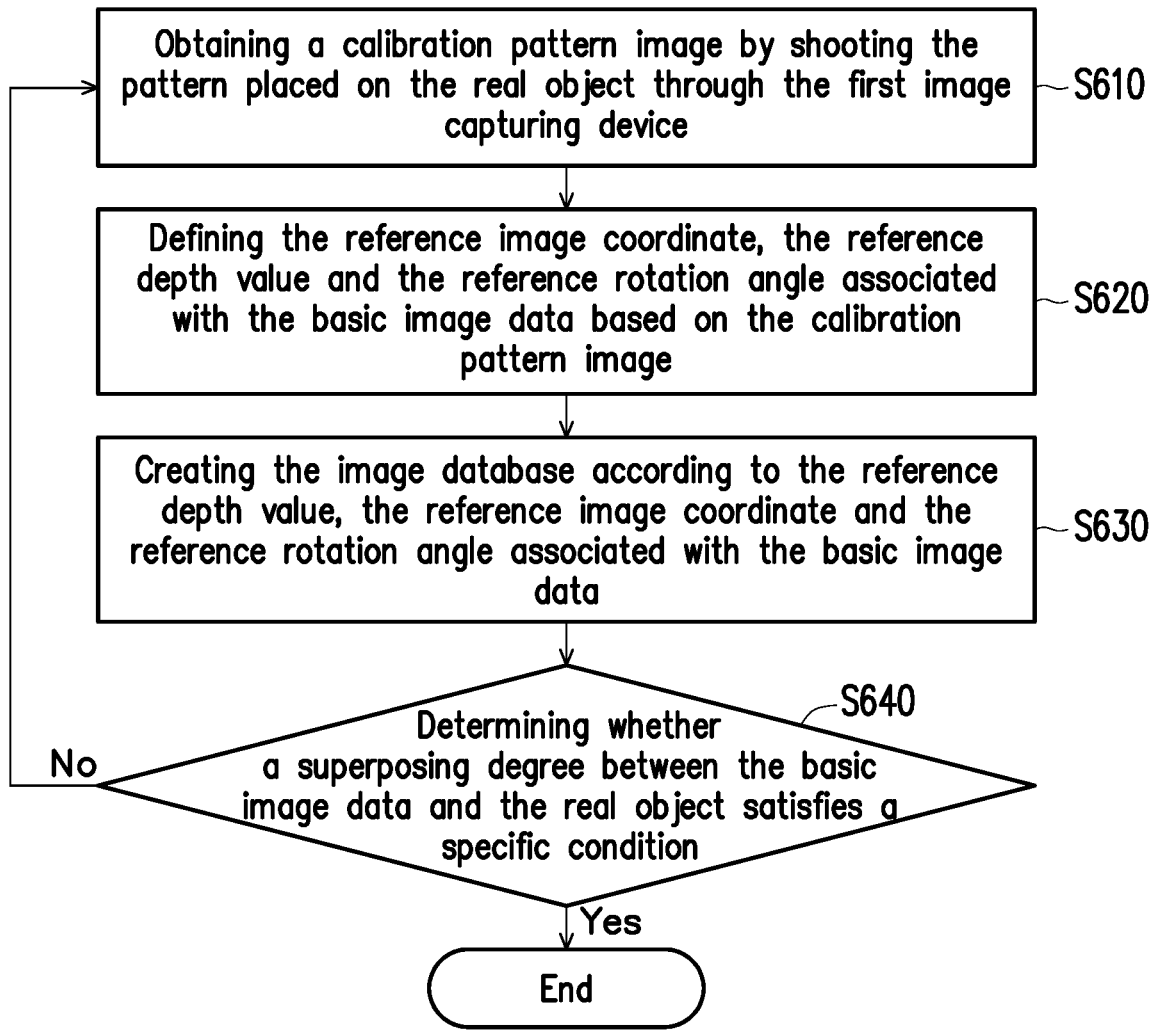
FIG. 6 is a flowchart of a camera calibration procedure in the information display method according to an embodiment of the disclosure.

FIG. 6 is a flowchart of a camera calibration procedure in the information display method according to an embodiment of the disclosure. The method described in FIG. 6 may be implemented in combination with the information display system 10 shown in FIG. 1. The following content refers to FIG. 1 and FIG. 6 together.

First, in step S610, a calibration pattern image is obtained by shooting the pattern P1 placed on the real object Obj_r1 through the first image capturing device 120. Then, in step S620, the processing device 130 defines the reference image coordinate, the reference depth value and the reference rotation angle associated with the basic image data based on the calibration pattern image. The processing device 130 may calculate a reference depth between the pattern P1 and the first image capturing device 120 according to the principle shown in FIG. 5. In addition, the processing device 130 may define a corresponding preset value for each of the reference image coordinate and the reference rotation angle. For example, the processing device 130 may define the reference image coordinate $(x_b, y_b)$ as $(0, 0)$ and define the reference rotation angle $(\phi_b, \theta_b, \psi_b)$ as $(0, 0, 0)$. In the case where the reference image coordinate $(x_b, y_b)$ and the reference rotation angle $(\phi_b, \theta_b, \psi_b)$ are defined as the preset values, the processing device 130 may mark the world coordinate of the pattern P1 based on Equation (4).

Next, in step S630, the processing device 130 creates the image database according to the reference depth value, the reference image coordinate $(x_b, y_b)$ and the reference rotation angle $(\phi_b, \theta_b, \psi_b)$ associated with the basic image data. Here, the processing device 130 may perform the geometric transformation on the basic image according to the defined reference depth value, the reference image coordinate $(x_b, y_b)$, the reference rotation angle $(\phi_b, \theta_b, \psi_b)$, the preset depth values, the preset image coordinates and the preset rotation angles to generate the corresponding augmented image data, and thereby create the image database that may be searched later. As described above, the processing device 130 may create the image database recorded with a plurality of pre-stored augmented images according to depth differences between the preset depth values, coordinate differences between the preset image coordinates and the reference image coordinate and the reference depth value and angle differences between the preset rotation angles and the reference rotation angle. In other words, each of the pre-stored augmented images in the image database may correspond to one of the preset depth values, one of the preset image coordinates and one of the rotation angles. Accordingly, the processing device 130 may select the augmented image data that may be superposed with the real object Obj_r1 from the pre-stored augmented images according to the detected depth value, the image coordinate and the rotation angle.

In step S640, the processing device 130 determines whether a superposing degree between the basic image data and the real object Obj_r1 satisfies a specific condition. In an embodiment of the disclosure, the first image capturing device 120 may obtain a real object image by shooting a real object, and the processing device 130 may perform an image recognition on the real object and locate an superposing area to be superposed with a virtual object. Next, the processing device 130 calculates a superposing degree percentage between the virtual object in the basic image and the superposing area of the real object image, and determines whether this numeralized superposing degree percentage is greater than a superposing threshold. If a determination result in step S640 is "No", the viewer U1 may adjust a placement position and a placement angle of the transparent display 110, and returns to step S610 to recreate the image database. If the determination result in step S640 is "Yes", the processing device 130 ends the camera calibration procedure. The camera calibration procedure may be executed before the processes shown in FIG. 3 and FIG. 4. By executing the camera calibration procedure, the processing device 130 may obtain the reference image coordinate, the reference depth value and the reference rotation angle corresponding to the basic image, and thereby create the image database stored with the pre-stored augmented images corresponding to the different preset image coordinates, the different preset depth values and the different preset rotation angles.

In an embodiment of the disclosure, the pattern P1 may further include virtual object information. Accordingly, the processing device 130 may obtain the virtual object information corresponding to the pattern by recognizing the pattern P1 according to the pattern image, and select the augmented image data from the image database according to the virtual object information and the relative position information. For instance, it is assumed that the pattern P1 is a two-dimensional barcode including a plurality of black squares and a plurality of white squares, and the pattern P1 is generated by encoding the virtual object information. Correspondingly, the processing device 130 may analyze and decode the pattern P1 to obtain the corresponding virtual object information so the transparent display 110 may display the corresponding augmented image data. The virtual object information may be an object name or an object ID. For instance, the processing device 130 may recognize the pattern P1 and know that the virtual object information corresponding to the pattern P1 is "Heart", and then the processing device 130 may obtain the augmented image data presenting heart information from the image database according to the relative position information and the virtual object information. Thus, the virtual object information carried by the pattern P1 may be used to determine information content displayed by the transparent display 110. Thus, if the pattern P1 on the real object Obj_r1 is replaced by another pattern, the transparent display 110 will display a virtual object corresponding to said another pattern.

Besides that the pattern features of the pattern P1 may be used to determine the display content, in an embodiment of the disclosure, the processing device 130 may also determine the display content according to an attachment position of the pattern P1 attached on the real object Obj_r1. In other words, the processing device 130 may obtain the virtual object information corresponding to the pattern by recognizing attachment position of the pattern P1 according to the pattern image, and select the augmented image data from the image database according to the virtual object information and the relative position information. For instance, when the processing device 130 determines that the pattern P1 is attached on a first attachment position (e.g., near the first pair of ribs) of the real object Obj_r1, the processing device 130 may select the augmented image data according to the virtual object information corresponding to the first attachment position (e.g., "the first pair of ribs"), and the transparent display 110 may also display the augmented image data including the first pair of ribs. When the processing device 130 determines that the pattern P1 is attached on a second attachment position (e.g., near the fifth pair of ribs) of the real object Obj_r1, the processing device 130 may select the augmented image data according to the virtual object information corresponding to the second attachment position (e.g., "the fifth pair of ribs"), and the transparent display 110 may also display the augmented image data including the fifth pair of ribs.

Figure 7:
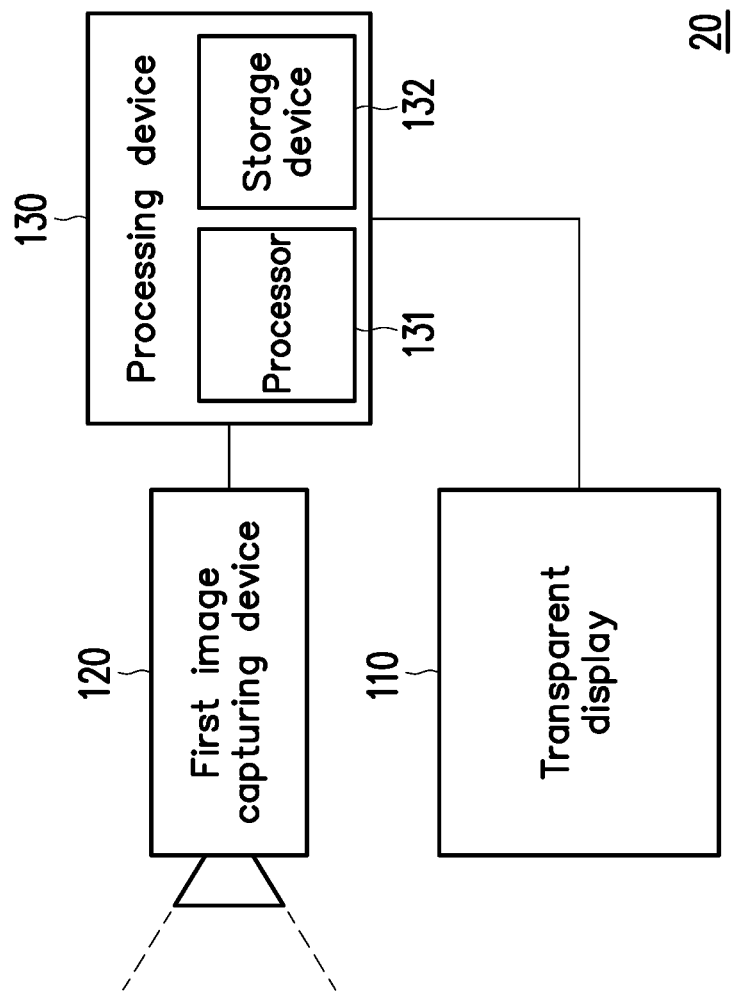
FIG. 7 is a schematic diagram of the information display system according to an embodiment of the disclosure.
Figure 7:
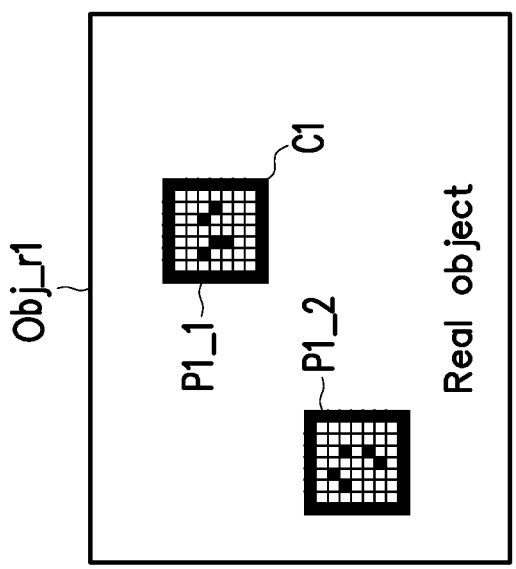

Although the above embodiment is described by taking one pattern as an example, the disclosure is not limited thereto. In an embodiment of the disclosure, a plurality of patterns may also be placed on the real object Obj_r1. Details regarding the above are provided with reference to the following embodiments. FIG. 7 is a schematic diagram of the information display system according to an embodiment of the disclosure. Referring to FIG. 7, an information display system 20 includes a first pattern P1_1, a second pattern P1_2, the transparent display 110, the first image capturing device 120 and the processing device 130. The processing device 130 is coupled to the transparent display 110 and the first image capturing device 120. The operations and functions of the transparent display 110, the first image capturing device 120, and the processing device 130 are similar to those of the embodiment of FIG. 1, which are not repeated hereinafter. The information display system 20 includes two patterns (i.e., the first pattern P1_1 and the second pattern P1_2).

Figure 8:
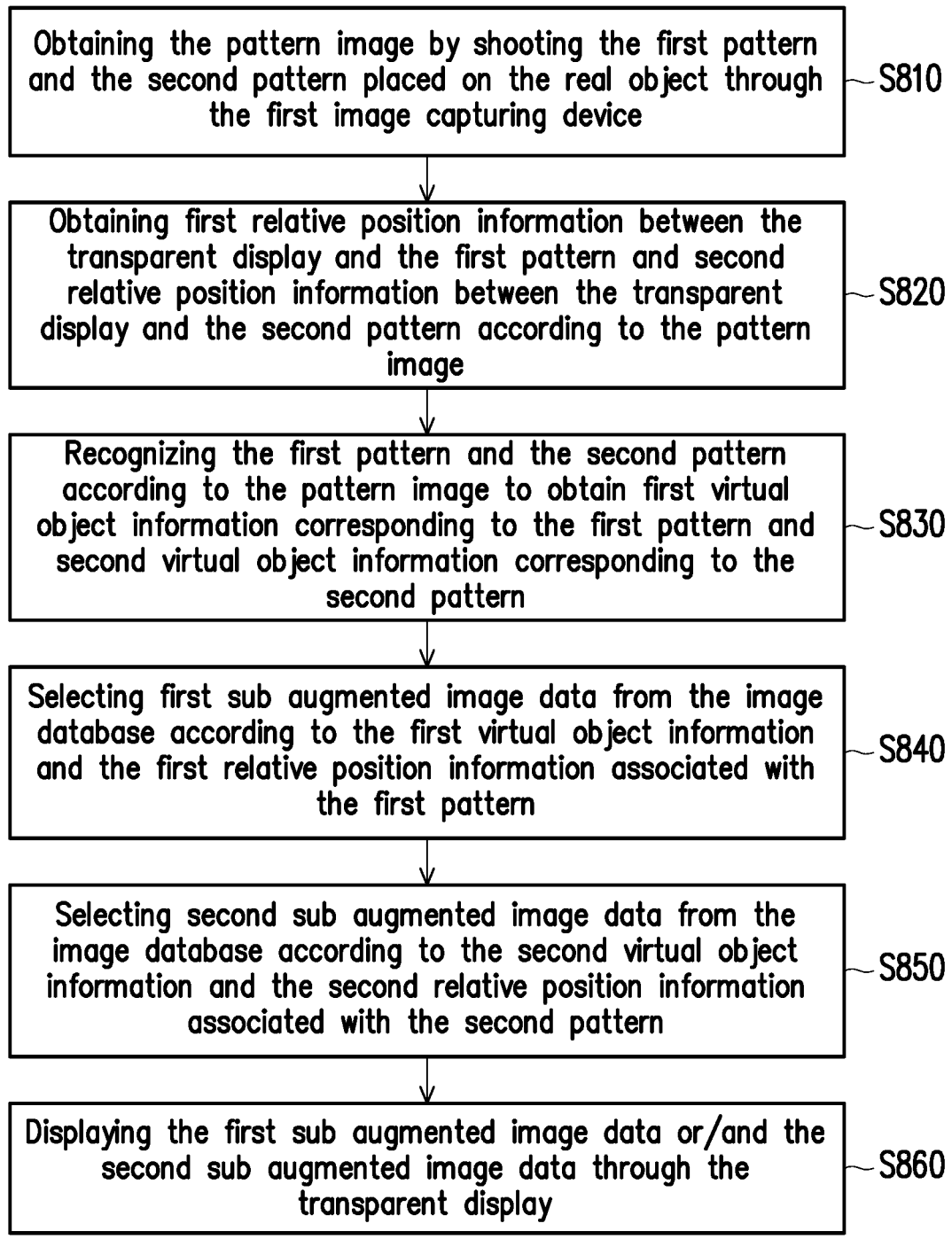
FIG. 8 is a flowchart of the information display method according to an embodiment of the disclosure.

FIG. 8 is a flowchart of the information display method according to an embodiment of the disclosure. The method described in FIG. 8 may be implemented in combination with the information display system 20 shown in FIG. 7. The following content refers to FIG. 7 and FIG. 8 together.

In step S810, the pattern image is obtained by shooting the first pattern P1_2 and the second pattern P1_2 placed on the real object Obj_r1 through the first image capturing device 120. In step S820, first relative position information between the transparent display 110 and the first pattern P1_1 and second relative position information between the transparent display 110 and the second pattern P1_2 are obtained according to the pattern image by the processing device 130. The method of calculating the first relative position information and the second relative position information may be the same as the foregoing description, which is not repeated hereinafter. In step S830, the first pattern P1_1 and the second pattern P1_2 are recognized according to the pattern image by the processing device 130 to obtain first virtual object information corresponding to the first pattern P1_1 and second virtual object information corresponding to the second pattern P1_2. For instance, the first virtual object information may be "Heart", and the second virtual object information may be "Stomach".

In step S840, first sub augmented image data is selected from the image database according to the first virtual object information and the first relative position information associated with the first pattern P11 by the processing device 130. In step S850, second sub augmented image data is selected from the image database according to the second virtual object information and the second relative position information associated with the second pattern P1_2 by the processing device 130. In an embodiment of the disclosure, the image database has sub class databases respectively corresponding to a plurality of different virtual objects. Therefore, when the processing device 130 obtains the first virtual object information corresponding to the first pattern P1_1, the processing device 130 may select the first sub augmented image data from a first sub class database associated with a first virtual object according to the relative position information based on the first pattern P1_1. When the processing device 130 obtains the second virtual object information corresponding to the first pattern P1_2, the processing device 130 may select the second sub augmented image data from a second sub class database associated with a second virtual object according to the relative position information based on the second pattern P1_2. Next, in step S860, the first sub augmented image data or/and the second sub augmented image data is/are displayed through the transparent display 110.

Figure 9C:
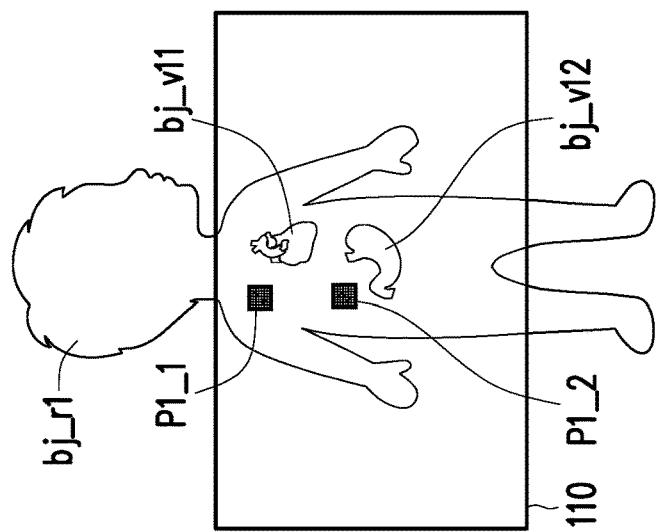
FIG. 9A to FIG. 9C are schematic scenario diagrams of the information display system according to an embodiment of the disclosure.
Figure 9B:
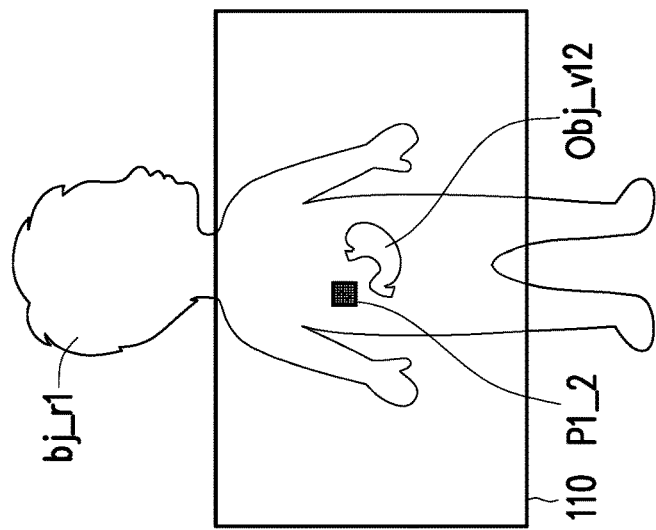
Figure 9A:
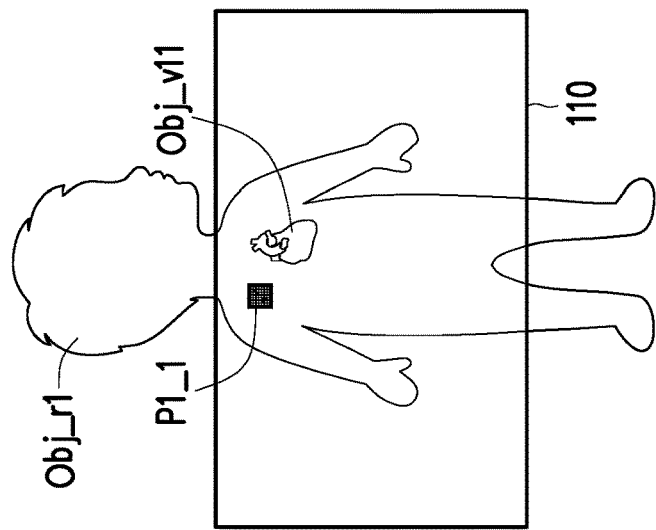

FIG. 9A to FIG. 9C are schematic scenario diagrams of the information display system according to an embodiment of the disclosure. Referring to FIG. 9A, it is assumed that only the first pattern P11 is placed on the real object Obj_r1, the processing device 130 will calculate a relative position relationship between the first pattern P1_1 and the transparent display 110, and recognize that the first virtual object information corresponding to the first pattern P1_1 is "Heart". Then, the transparent display 110 will display the first sub augmented image data including the heart information. The transparent display 110 will display a first virtual object Obj_v11 (i.e., a heart image) augmented based on the real object Obj_r1 so the viewer may see that the first virtual object Obj_v11 is superposed on the real object Obj_r1 through the transparent display 110.

Referring to FIG. 9B, it is assumed that only the second pattern P1_2 is placed on the real object Obj_r1, the processing device 130 will calculate a relative position relationship between the second pattern P1_2 and the transparent display 110, and recognize that the second virtual object information corresponding to the second pattern P1_2 is "Stomach". Then, the transparent display 110 will display the second sub augmented image data including stomach information. The transparent display 110 will display a second virtual object Obj_v12 (i.e., a stomach image) augmented based on the real object Obj_r1 so the viewer may see that the second virtual object Obj_v12 is superposed on the real object Obj_r1 through the transparent display 110.

Referring to FIG. 9C, it is assumed that the first pattern P1_1 and the second pattern P1_2 are placed on the real object Obj_r1 at the same time, the processing device 130 will calculate a second relative position relationship between the second pattern P1_2 and the transparent display 110 and a first relative position relationship between the first pattern P1_1 and the transparent display 110, respectively. The processing device 130 will further recognize that the first virtual object information corresponding to the first pattern P1_1 is "Heart", and recognize that the second virtual object information corresponding to the second pattern P1_2 is "Stomach". Then, the processing device 130 generates a superposed augmented image data by superposing the first sub augmented image data and the second sub augmented image data. Then, the transparent display 110 will display the superposed augmented image data including the heart information and the stomach information. The transparent display 110 will display the first virtual object Obj_v11 (i.e., the heart image) and the second virtual object Obj_v12 (i.e., the stomach image) augmented based on the real object Obj_r1 at the same time so the viewer may see that the first virtual object Obj_v11 and the second virtual object Objs_v12 are superposed on the real object Obj_r1 through the transparent display 110.

It is worth noting that, in an embodiment of the disclosure, an augmented image content displayed by the transparent display or whether to display the augmented image data or not may be determined according to a sight of the viewer and identification information on the viewer. Details regarding the above are provided with reference to the following embodiments.

Figure 10:
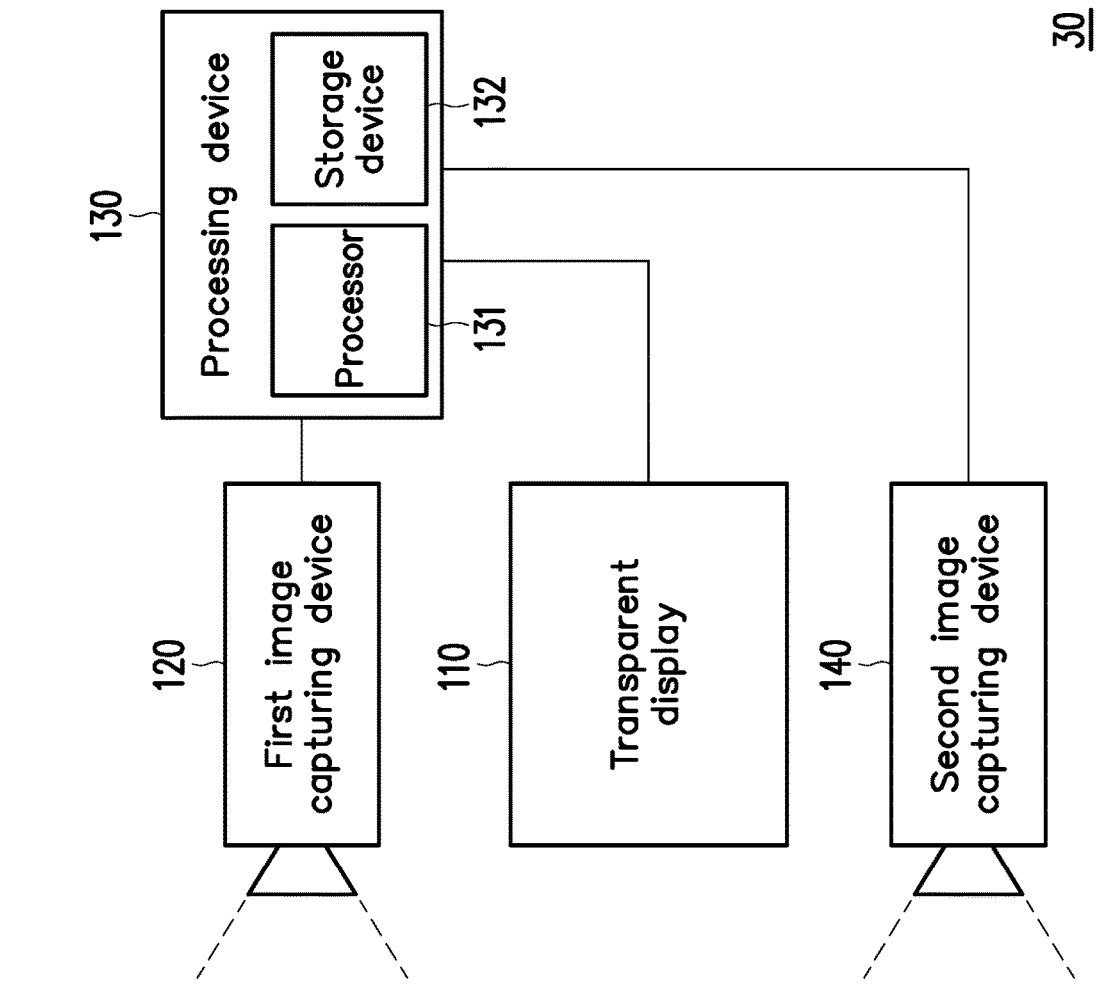
FIG. 10 is a schematic diagram of the information display system according to an embodiment of the disclosure.
Figure 10:
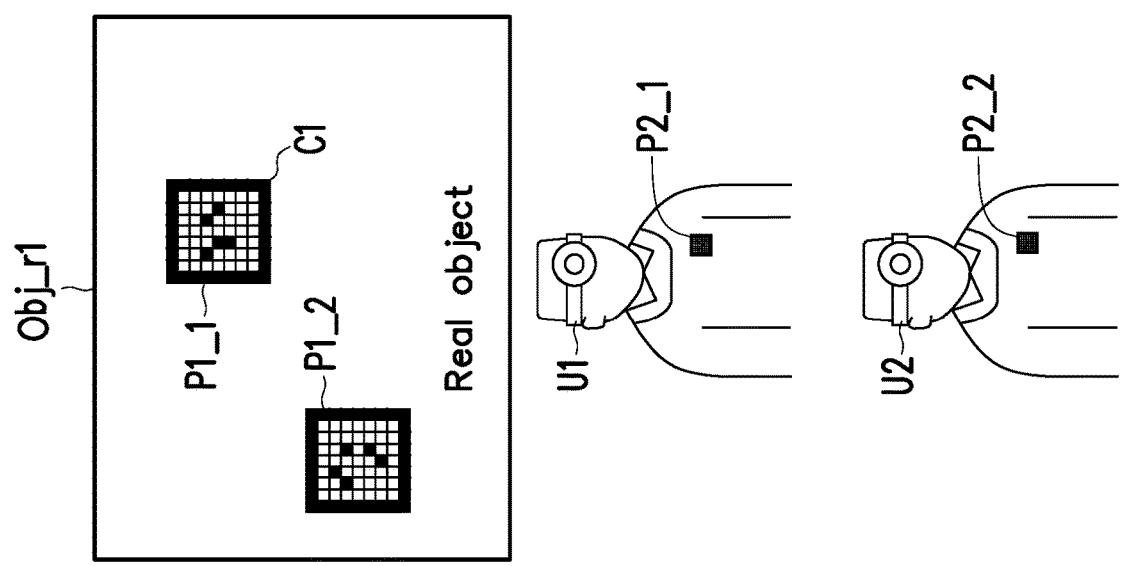

FIG. 10 is a schematic diagram of the information display system according to an embodiment of the disclosure. Referring to FIG. 10, an information display system 30 includes the first pattern P1_1, the second pattern P1_2, a viewer pattern P2_1, a viewer pattern P2_2, the transparent display 110, the first image capturing device 120, a second image capturing device 140 and the processing device 130. The processing device 130 is coupled to the transparent display 110, the first image capturing device 120 and the second image capturing device 140. The operations and functions of the first pattern P1_1, the second pattern P12, the transparent display 110, the first image capturing device 120, and the processing device 130 are similar to those of the embodiments of FIG. 1 and FIG. 7, which are not repeated hereinafter. The information display system 30 includes two image capturing devices (i.e., the first image capturing device 120 and the second image capturing device 140).

The viewer pattern P2_1 and the viewer pattern P2_2 may be located on the viewer U1 and a viewer U2, respectively. The viewer pattern P2_1 and the viewer pattern P2_2 may include a one-dimensional barcode, a two-dimensional barcode or other recognizable pattern. The viewer totem P2_1 and the viewer pattern P2_2 may be used as the identification information of the viewer U1 and the viewer U2, respectively. In other words, the viewer totem P2_1 includes viewer information of the viewer U1 and the viewer pattern P2_2 includes viewer information of the viewer U2.

The second image capturing device 140 is adapted to perform an image sensing function. The second image capturing device 140 may include a lens and a photosensitive element for obtaining a viewer image by shooting the viewer U1 of the transparent display 110. In an embodiment of the disclosure, the first image capturing device 120 captures a scene behind the transparent display 110 (which may include the real object Obj_r1, the first pattern P1_1, and the second pattern P1_2), and the second image capturing device 140 captures a scene in front of the transparent display 110 (which may include the viewer U1 or/and the viewer U2).

Figure 11:
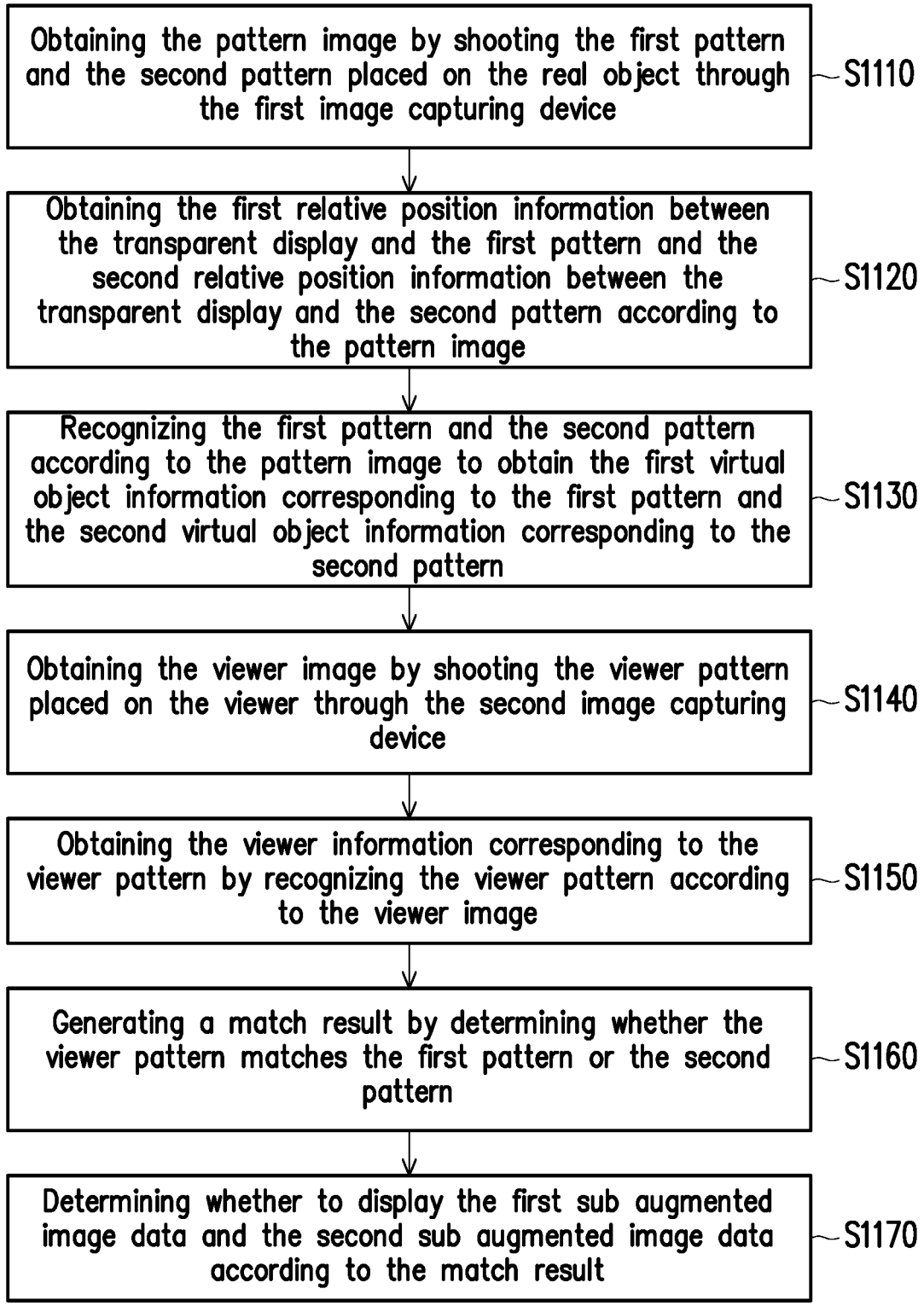
FIG. 11 is a flowchart of the information display method according to an embodiment of the disclosure.

FIG. 11 is a flowchart of the information display method according to an embodiment of the disclosure. The method described in FIG. 11 may be implemented in combination with the information display system 30 shown in FIG. 10. The following content refers to FIG. 10 and FIG. 11 together.

In step S1110, the pattern image is obtained by shooting the first pattern P1_2 and the second pattern P1_2 placed on the real object Obj_r1 through the first image capturing device 120. In step S1120, the first relative position information between the transparent display 110 and the first pattern P1_1 and the second relative position information between the transparent display 110 and the second pattern P1_2 are obtained according to the pattern image by the processing device 130. The method of calculating the first relative position information and the second relative position information may be the same as the foregoing description, which is not repeated hereinafter. In step S1130, the first pattern P1_1 and the second pattern P1_2 are recognized according to the pattern image by the processing device 130 to obtain the first virtual object information corresponding to the first pattern P1_1 and the second virtual object information corresponding to the second pattern P1_2. In step S1140, the viewer image is obtained by shooting the viewer pattern P2_1 placed on the viewer U1 through the second image capturing device 140. In step S1150, the viewer information corresponding to the viewer pattern P2_1 is obtained by recognizing the viewer pattern P2_1 according to the viewer image by the processing device 130, and the viewer information is, for example, a viewer ID or the like.

In step S1160, a match result is generated by determining whether the viewer pattern P2_1 matches the first pattern P1_1 or the second pattern P1_2 according to the viewer information, the first virtual object information and the second virtual object information by the processing device 130. In step S1170, whether to display the first sub augmented image data and the second sub augmented image data is determined according to the match result by the processing device 130. According to the viewer information, the first virtual object information and the second virtual object information, the processing device 130 may determine whether the viewer U1 has permissions for viewing the first virtual object having the first virtual object information and the second virtual object having the second virtual object information, and then determine whether the viewer pattern P2_1 matches the first pattern P1_1 and/or the second pattern P1_2.

In other words, if the viewer pattern P2_1 matches the first pattern P1_1, it means that the viewer U1 has the permission for viewing the first virtual object having the first virtual object information. Accordingly, the processing device 130 determines to display the first sub augmented image data associated with the first pattern P1_1 and including the first virtual object according to the match result. In addition, if the viewer pattern P2_1 matches the second pattern P1_2, it means that the viewer U1 has the permission for viewing the second virtual object having the second virtual object information. Accordingly, the processing device 130 determines to display the second sub augmented image data associated with the second pattern P1_2 and including the second virtual object according to the match result.

The above embodiment is described by using an example in which the transparent display 110 is located between the viewer U1 and the real object Obj_r1 and a matching with the viewer pattern P2_1. Nonetheless, when the transparent display 110 is located between the viewer U2 and the real object Obj_r1, steps S1140 to S1170 may also be performed for the viewer U2 and the viewer pattern P2_2 thereof. Thus, in a scenario where multiple viewer are using the transparent display 110, the display content of the transparent display 110 may be determined according to the viewer who is currently using the transparent display 110. When the transparent display 110 is moved from the front of the viewer U1 to the front of the viewer U2, other than allowing the currently displayed virtual object to be superposed on the real object according to the relative position information, the transparent display 110 may further determine which virtual objects are to be displayed according to the viewer currently located in front of the transparent display 110.

Figure 12:
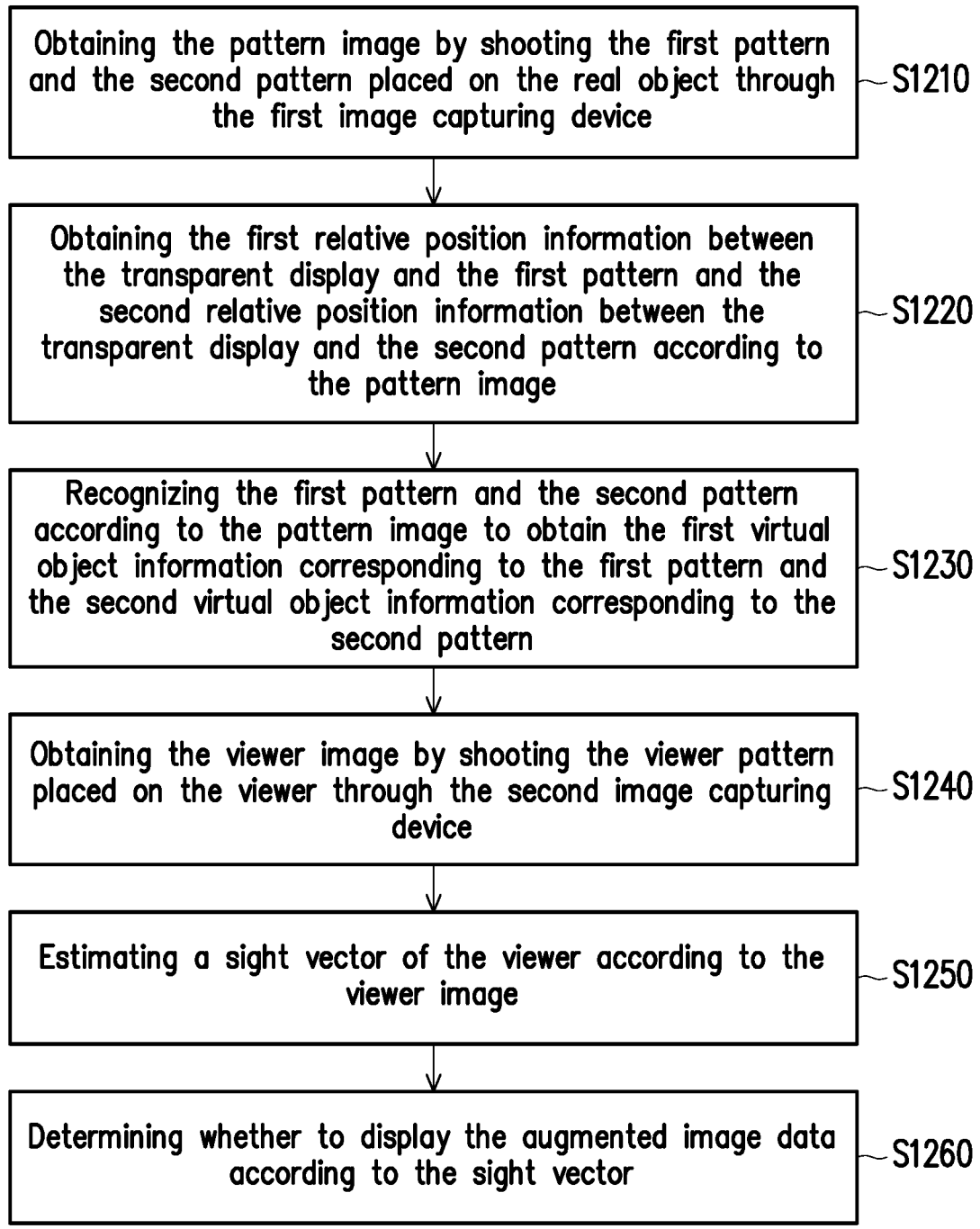
FIG. 12 is a flowchart of the information display method according to an embodiment of the disclosure.

FIG. 12 is a flowchart of the information display method according to an embodiment of the disclosure. The method described in FIG. 12 may be implemented in combination with the information display system 30 shown in FIG. 10. The following content refers to FIG. 10 and FIG. 12 together.

In step S1210, the pattern image is obtained by shooting the first pattern P1_2 and the second pattern P1_2 placed on the real object Obj_r1 through the first image capturing device 120. In step S1220, the first relative position information between the transparent display 110 and the first pattern P1_1 and the second relative position information between the transparent display 110 and the second pattern P1_2 are obtained according to the pattern image by the processing device 130. The method of calculating the first relative position information and the second relative position information may be the same as the foregoing description, which is not repeated hereinafter. In step S1230, the first pattern P1_1 and the second pattern P1_2 are recognized according to the pattern image by the processing device 130 to obtain the first virtual object information corresponding to the first pattern P1_1 and the second virtual object information corresponding to the second pattern P1_2. In step S1240, the viewer image is obtained by shooting the viewer pattern P2_1 placed on the viewer U1 through the second image capturing device 140.

In step S1250, a sight vector of the viewer U1 is estimated according to the viewer image by the processing device 130. The processing device 130 may estimate the sight vector of the viewer U1 according to eye information, face information and head information in the viewer image. In step S1260, whether to display the augmented image data is determined according to the sight vector by the processing device 130. In an embodiment of the disclosure, the processing device 130 may determine whether an extension of the sight vector may pass through a display plane of the transparent display 110, so as to determine whether to display the augmented image data or not.

In an embodiment of the disclosure, the processing device 130 may determine whether the sight vector matches a normal direction of the first pattern P1_1 or a normal direction of the second pattern P1_2. When the viewer U1 looks at the first pattern P1_1 or its nearby area, the normal direction of the first pattern P1_1 is substantially opposite to a direction of the sight vector of the viewer U1. Accordingly, the processing device 130 may determine whether the sight vector matches the normal direction of the first pattern P1_1 according to the three-axis rotation angles of the normal direction of the first pattern P1_1 and the three-axis rotation angles of the sight vector. If the sight vector may match the normal direction of the first pattern P1_1, the processing device 130 determines to display the first sub augmented image data associated with the first pattern P1_1. If the sight vector may match the normal direction of the second pattern P1_2, the processing device 130 determines to display the second sub augmented image data associated with the second pattern P1_2. The normal direction of the first pattern P11 may be the rotation angle in the relative position information between the first pattern P1_1 and the transparent display 110 in the foregoing embodiment.

Figure 13B:
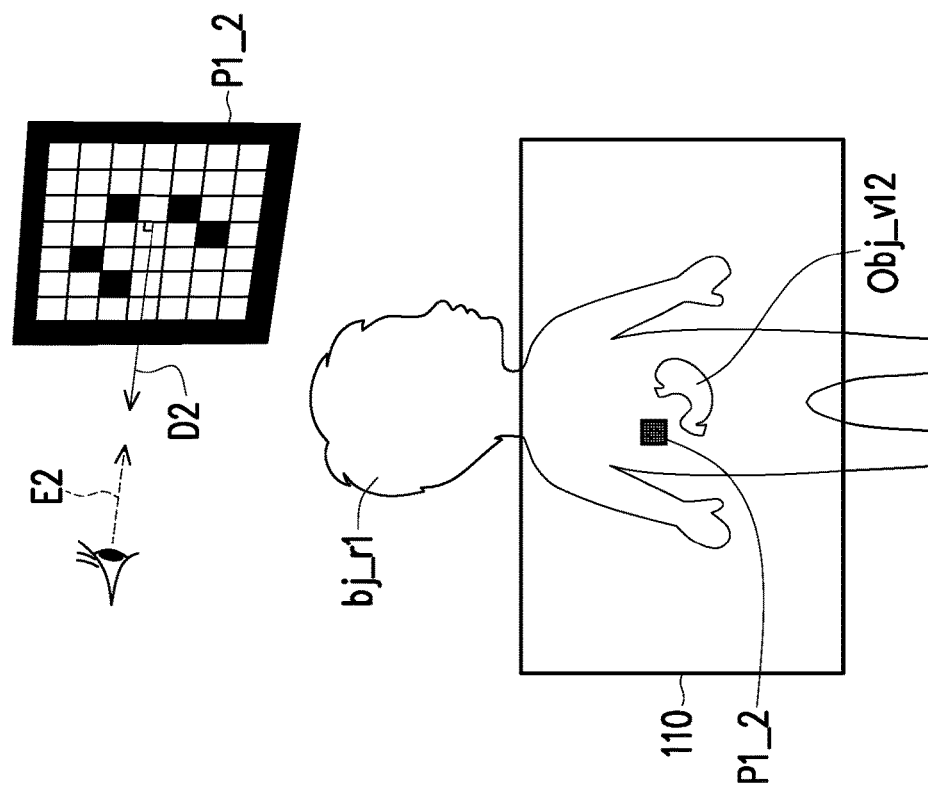
FIG. 13A and FIG. 13B are schematic scenario diagrams for determining a display content in accordance with a sight vector according to an embodiment of the disclosure.
Figure 13A:
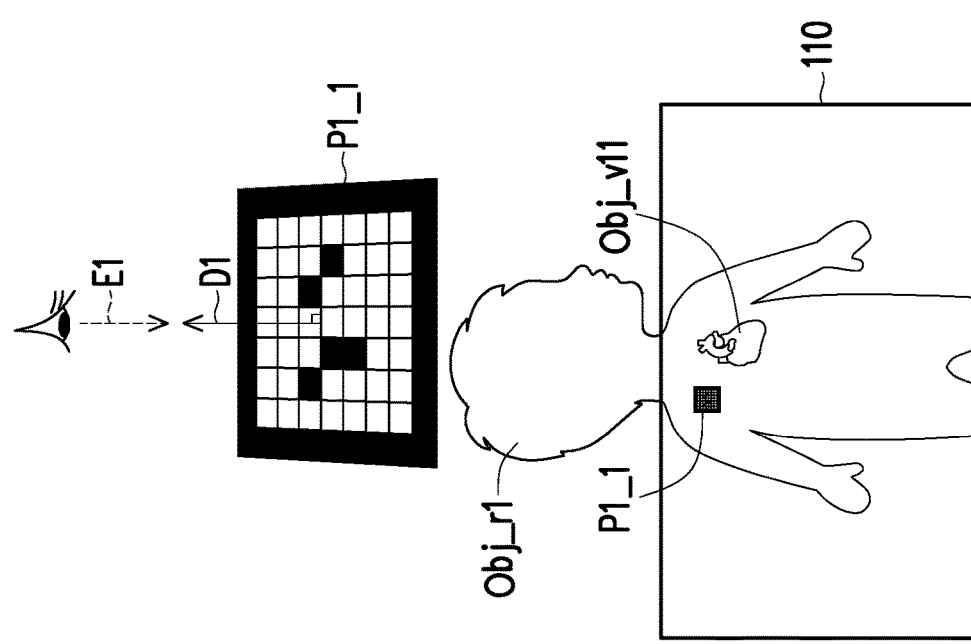

FIG. 13A and FIG. 13B are schematic scenario diagrams for determining a display content in accordance with a sight vector according to an embodiment of the disclosure. Referring to FIG. 13A, when the processing device 130 determines that a normal direction D1 of the first pattern P1_1 matches a sight vector E1, the processing device 130 controls the transparent display 110 to display the first virtual object Obj_v11 associated with the first pattern P1_1. The augmented image data including the first virtual object Obj_v11 is obtained according to the relative position information between the transparent display 110 and the first pattern P1_1. Referring to FIG. 13B, it is assumed that the viewer U1 changes a viewing direction so the sight vector E1 is changed to a sight vector E2. When the processing device 130 determines that a normal direction D2 of the second pattern P1_2 matches the sight vector E2, the processing device 130 controls the transparent display 110 to display the second virtual object Obj_v12 associated with the second pattern P1_2. The augmented image data including the second virtual object Obj_v12 is obtained according to the relative position information between the transparent display 110 and the second pattern P1_2.

FIG. 10, FIG. 11 and FIG. 12 are described by using an example in which the first image capturing device 120 captures the pattern image by shooting the first pattern P1_1 and the second pattern P1_2 and the second image capturing device 140 captures the viewer image by shooting the viewers U1 and U2. That is to say, the foregoing embodiments are described by an implementation in which the pattern image and the viewer image are respectively captured at two sides of the transparent display 110 by different image capturing devices, but the disclosure is not limited thereto. In an embodiment of the disclosure, the pattern image and the viewer image may be respectively captured at two sides of the transparent display 110 by a flippable image capturing device. In an embodiment of the disclosure, the first image capturing device 120 has a flipping function so the lens of the first image capturing device 120 may capture the pattern image and the viewer image at two sides of the transparent display 110 by flipping 180 degrees.

In the embodiments of the disclosure, the augmented image data displayed by the transparent display may be determined according to the depth value, the image coordinate and the rotation angle of the pattern on the real object. As a result, when the viewer is viewing the transparent display, even if the transparent display is moved dynamically, the virtual object on the transparent display and the real object behind the transparent display may achieve a well superposition to provide a comfortable viewing experience.

Although the present disclosure has been described with reference to the above embodiments, it is apparent to one of the ordinary skill in the art that modifications to the described embodiments may be made without departing from the spirit of the present disclosure. Accordingly, the scope of the present disclosure will be defined by the attached claims not by the above detailed descriptions.

It will be apparent to those skilled in the art that various modifications and variations can be made to the disclosed embodiments. It is intended that the specification and examples be considered as exemplary only, with a true scope of the disclosure being indicated by the following claims and their equivalents.

The invention claimed is:

1. An information display method adapted to an information display system comprising a first image capturing device and a transparent display, the method comprising:
   obtaining a pattern image by shooting at least one pattern placed on a real object through the first image capturing device, wherein the real object is located on one side of the transparent display;
   obtaining relative position information between the transparent display and the at least one pattern according to the pattern image;
   obtaining augmented image data according to the relative position information; and
   displaying the augmented image data through the transparent display, wherein the augmented image data comprise a virtual object augmented based on the real object,
   wherein the method further comprises:
   obtaining virtual object information corresponding to the at least one pattern by recognizing the at least one pattern according to the pattern image, wherein the at least one pattern comprises a first pattern and a second pattern,
   wherein the step of obtaining the augmented image data according to the relative position information further comprises:
   selecting the augmented image data from an image database according to the virtual object information and the relative position information,
   wherein the step of displaying the augmented image data through the transparent display comprises:
   generating superposed augmented image data by superposing first sub augmented image data corresponding to the first pattern and the second sub augmented image data corresponding to the second pattern, and displaying the superposed augmented image data through the transparent display.

2. The information display method according to claim 1, wherein the step of obtaining the relative position information between the transparent display and the at least one pattern according to the pattern image comprises:
   calculating, according to the pattern image, an image coordinate of the at least one pattern on an image coordinate system and a depth value of the at least one pattern relative to the first image capturing device; and
   calculating a rotation angle of the at least one pattern according to the pattern image, wherein the relative position information comprises the image coordinate, the depth value and the rotation angle.

3. The information display method according to claim 2, wherein the step of calculating, according to the pattern image, the image coordinate of the at least one pattern on the image coordinate system and the depth value of the at least one pattern relative to the first image capturing device comprises:
   calculating the depth value according to an intrinsic parameter of the first image capturing device, actual size information of the at least one pattern and imaging size information of the at least one pattern on the pattern image; and
   calculating the image coordinate of the at least one pattern on the image coordinate system according to a world coordinate of the at least one pattern and the intrinsic parameter of the first image capturing device,
   wherein the step of calculating the rotation angle of the at least one pattern according to the pattern image comprises:
   calculating an extrinsic parameter matrix of the first image capturing device according to the world coordinate and the image coordinate of the at least one pattern and the intrinsic parameter of the first image capturing device; and
   calculating the rotation angle according to the extrinsic parameter matrix.

4. The information display method according to claim 2, wherein the step of obtaining the augmented image data according to the relative position information comprises:
   obtaining the augmented image data according to the image coordinate, the depth value and the rotation angle, wherein the augmented image data is generated by performing a geometric transformation on basic image data according to the image coordinate, the depth value and the rotation angle; and
   displaying the augmented image data between a viewer and the real object through the transparent display, wherein the viewer is located on another side of the transparent display.

5. The information display method according to claim 4, wherein before the step of obtaining the pattern image by shooting the at least one pattern placed on the real object through the first image capturing device, the method further comprises:
   obtaining a calibration pattern image by shooting the at least one pattern placed on the real object through the first image capturing device; and
   defining a reference image coordinate, a reference depth value and a reference rotation angle associated with the basic image data based on the calibration pattern image,
   wherein the augmented image data is generated by performing the geometric transformation on the basic image data according to a coordinate difference between the reference image coordinate and the image coordinate, a depth difference between the reference depth value and the depth value and an angle difference between the reference rotation angle and the rotation angle.

6. The information display method according to claim 1, wherein the step of obtaining the virtual object information corresponding to the at least one pattern by recognizing the at least one pattern according to the pattern image comprises:
   recognizing the first pattern and the second pattern according to the pattern image to obtain first virtual object information corresponding to the first pattern and second virtual object information corresponding to the second pattern, wherein the step of obtaining the augmented image data according to the relative position information further comprises:
selecting the first sub augmented image data from the image database according to the first virtual object information and first relative position information associated with the first pattern; and
selecting the second sub augmented image data from the image database according to the second virtual object information and second relative position information associated with the second pattern.

7. The information display method according to claim 1, wherein the information display system farther comprises a second image capturing device, and the method further comprises:
obtaining a viewer image by shooting a viewer pattern placed on a viewer through the second image capturing device;
obtaining viewer information corresponding to the viewer pattern by recognizing the viewer pattern according to the viewer image; and
generating a match result by determining whether the viewer pattern matches the first pattern or the second pattern according to the viewer information, the first virtual object information and the second virtual object information,
wherein the step of displaying the augmented image data through the transparent display comprises:
determining whether to display the first sub augmented image data and the second sub augmented image data according to the match result.

8. The information display method according to claim 1, wherein the information display system further comprises a second image capturing device, and the method further comprises:
obtaining a viewer image by shooting a viewer through the second image capturing device; and
estimating a sight vector of the viewer according to the viewer image,
wherein the step of displaying the augmented image data through the transparent display comprises:
determining whether to display the augmented image data according to the sight vector.

9. An information display system, comprising:
at least one pattern placed on a real object;
a transparent display;
a first image capturing device for obtaining a pattern image by shooting the at least one pattern placed on the real object, wherein the real object is located on one side of the transparent display; and
a processing device coupled to the transparent display and the first image capturing device, the processing device being configured to perform following steps of:
obtaining relative position information between the transparent display and the at least one pattern according to the pattern image;
obtaining augmented image data according to the relative position information; and
displaying the augmented image data through the transparent display,
wherein the augmented image data comprise a virtual object augmented based on the real object,
wherein the processor is configured to perform following steps of:
obtaining virtual object information corresponding to the at least one pattern by recognizing the at least one pattern according to the pattern image, wherein the at least one pattern comprises a first pattern and a second pattern; and
selecting the augmented image data from an image database according to the virtual object information and the relative position information,
wherein the processor is configured to perform following steps of:
generating superposed augmented image data by superposing first sub augmented image data corresponding to the first pattern and second sub augmented image data corresponding to the second pattern, and displaying the superposed augmented image data through the transparent display.

10. The information display system according to claim 9, wherein the processor is configured to perform following steps of:
calculating, according to the pattern image, an image coordinate of the at least one pattern on an image coordinate system and a depth value of the at least one pattern relative to the first image capturing device; and
calculating a rotation angle of the at least one pattern according to the pattern image, wherein the relative position information comprise the image coordinate, the depth value and the rotation angle.

11. The information display system according to claim 10, wherein the processor is configured to perform following steps of:
calculating the depth value according to an intrinsic parameter of the first image capturing device, actual size information of the at least one pattern and imaging size information of the at least one pattern on the pattern image;
calculating the image coordinate of the at least one pattern on the image coordinate system according to a world coordinate of the at least one pattern and the intrinsic parameter of the first image capturing device;
calculating an extrinsic parameter matrix of the first image capturing device according to the world coordinate and the image coordinate of the at least one pattern and the intrinsic parameter of the first image capturing device; and
calculating the rotation angle according to the extrinsic parameter matrix.

12. The information display system according to claim 10, wherein the processor is configured to perform following steps of:
obtaining the augmented image data according to the image coordinate, the depth value and the rotation angle, wherein the augmented image data is generated by performing a geometric transformation on basic image data according to the image coordinate, the depth value and the rotation angle,
wherein the transparent display displays the augmented image data between a viewer and the real object, wherein the viewer is located on another side of the transparent display.

13. The information display system according to claim 12, wherein the processor is configured to perform following steps of:
obtaining a calibration pattern image by shooting the at least one pattern placed on the real object through the first image capturing device; and
defining a reference image coordinate, a reference depth value and a reference rotation angle associated with the basic image data based on the calibration pattern image, wherein the augmented image data is generated by performing the geometric transformation on the basic image data according to a coordinate difference between the reference image coordinate and the image coordinate, a depth difference between the reference depth value and the depth value and an angle difference between the reference rotation angle and the rotation angle.

14. The information display system according to claim 9, wherein the processor is configured to perform following steps of:
- recognizing the first pattern and the second pattern according to the pattern image to obtain first virtual object information corresponding to the first pattern and second virtual object information corresponding to the second pattern;
- selecting the first sub augmented image data from the image database according to the first virtual object information and first relative position information associated with the first pattern; and
- selecting the second sub augmented image data from the image database according to the second virtual object information and second relative position information associated with the second pattern.

15. The information display system according to claim 9, further comprising: a second image capturing device for obtaining a viewer image by shooting a viewer pattern placed on a viewer, wherein the processor is configured to perform following steps of:
- obtaining viewer information corresponding to the viewer pattern by recognizing the viewer pattern according to the viewer image;
- generating a match result by determining whether the viewer pattern matches the first pattern or the second pattern according to the viewer information, the first virtual object information and the second virtual object information; and
- determining whether to display the first sub augmented image data and the second sub augmented image data according to the match result.

16. The information display system according to claim 9, further comprising: a second image capturing device for obtaining a viewer image by shooting a viewer pattern placed on a viewer, wherein the processor is configured to perform following steps of:
- estimating a sight vector of the viewer according to the viewer image; and
- determining whether to display the augmented image data according to the sight vector.

* * * * *